United States Patent
Lincoln

[11] Patent Number: 6,109,832
[45] Date of Patent: Aug. 29, 2000

[54] RAM BURSTER AND METHOD FOR INSTALLING TUBULAR CASING UNDERGROUND

[76] Inventor: David A. Lincoln, 5500 E. 56th Ave., Commerce City, Colo. 80022

[21] Appl. No.: 09/054,353

[22] Filed: Apr. 2, 1998

[51] Int. Cl.[7] ........................................ E02F 5/10
[52] U.S. Cl. ........................................ 405/184; 175/53
[58] Field of Search .......................... 175/53; 405/154, 405/184, 156

[56] References Cited

U.S. PATENT DOCUMENTS

| | | | |
|---|---|---|---|
| Re. 35,271 | 6/1996 | Fisk et al. | 405/154 |
| Re. 35,542 | 6/1997 | Fisk et al. | 405/156 |
| 3,763,939 | 10/1973 | Sudnishnikov et al. | 173/91 |
| 3,952,813 | 4/1976 | Chepurnoi et al. | 173/91 |
| 4,507,019 | 3/1985 | Thompson | 405/154 |
| 4,738,565 | 4/1988 | Streatfield et al. | 405/154 |
| 5,076,731 | 12/1991 | Luksch | 405/154 |
| 5,112,158 | 5/1992 | Mc Connell | 405/156 |
| 5,192,165 | 3/1993 | Torielli | 405/156 |
| 5,207,533 | 5/1993 | Federspiel | 405/156 |
| 5,302,053 | 4/1994 | Moriarty | 405/154 |
| 5,403,122 | 4/1995 | Granella | 405/184 |
| 5,456,552 | 10/1995 | Cherrington | 405/184 |
| 5,480,263 | 1/1996 | Kayes | 405/154 |
| 5,482,404 | 1/1996 | Tenbusch | 405/154 |
| 5,507,597 | 4/1996 | Mc Connell | 405/154 |
| 5,544,977 | 8/1996 | Cravy et al. | 405/154 |
| 5,628,585 | 5/1997 | Parish, II et al. | 405/154 |
| 5,816,745 | 10/1998 | Tenbusch, II | 405/184 |
| 5,984,582 | 11/1999 | Schwert | 405/184 |

*Primary Examiner*—David Bagnell
*Assistant Examiner*—Zakiya Walker
*Attorney, Agent, or Firm*—Pittenger & Smith, P.C.; J. Mark Smith

[57] ABSTRACT

A method and an apparatus for new installation or bursting and replacement of underground pipelines, without the necessity of trenches. This method and apparatus allows for the installation without the need for large excavations at the end point of the line and allows for nondestructive termination at an existing vault, structure or manhole without having to rebuild the structure, vault or manhole. The apparatus includes a head assembly that breaks apart fracturable pipe and expands the hole to accommodate the desired size of pipe. Because of the method of applying forces, the expansion of pipe diameter can be very substantial. Because of the head assembly, the head can be disassembled as the pipe and head enter a manhole, vault, structure or limited space and thus no need to excavate the vault or structure or create a large end excavation is necessary, thus saving time and money and avoiding disruption of traffic in street locations.

51 Claims, 8 Drawing Sheets

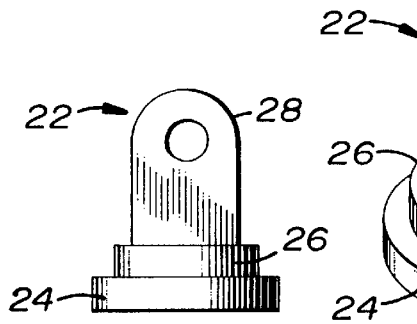
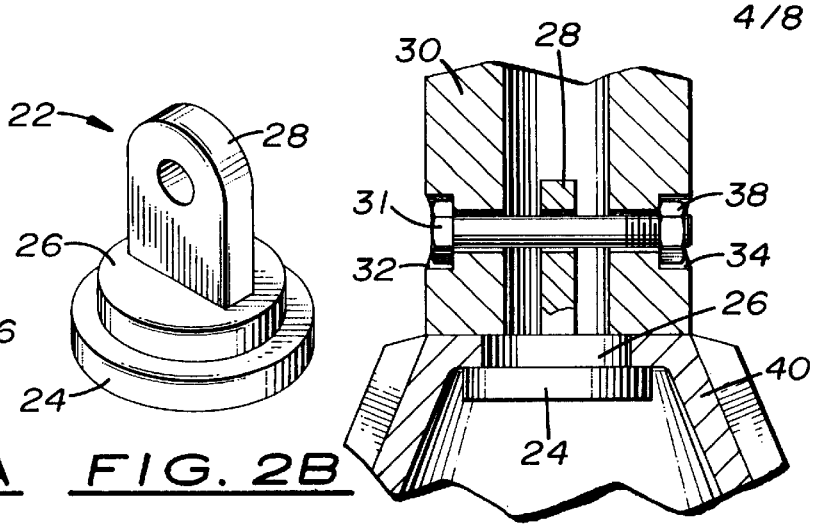
FIG. 2A   FIG. 2B   FIG. 2C
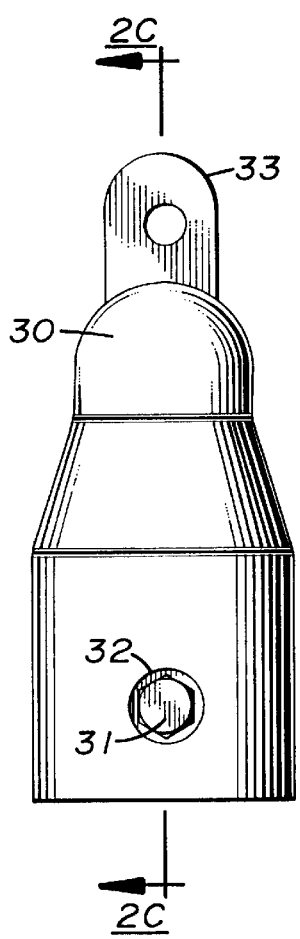
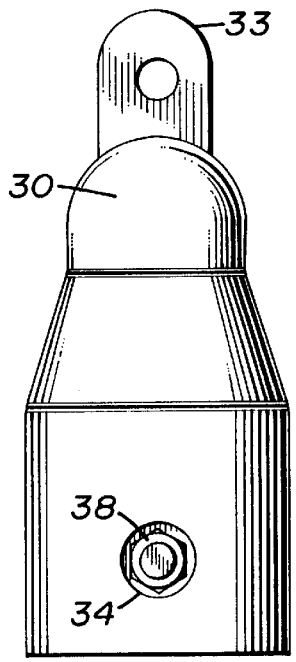
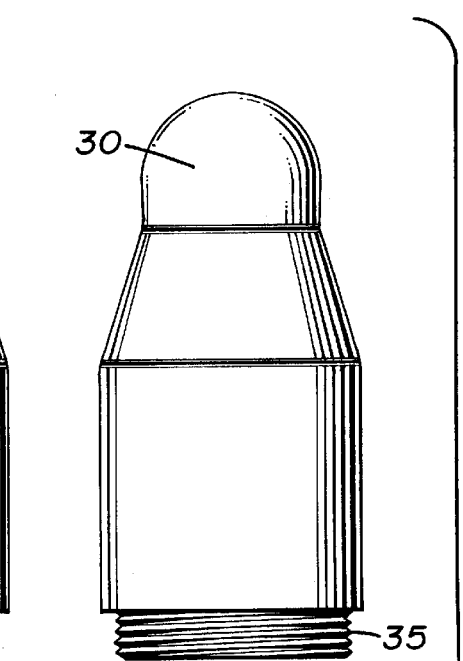
FIG. 3A   FIG. 3B   FIG. 3C

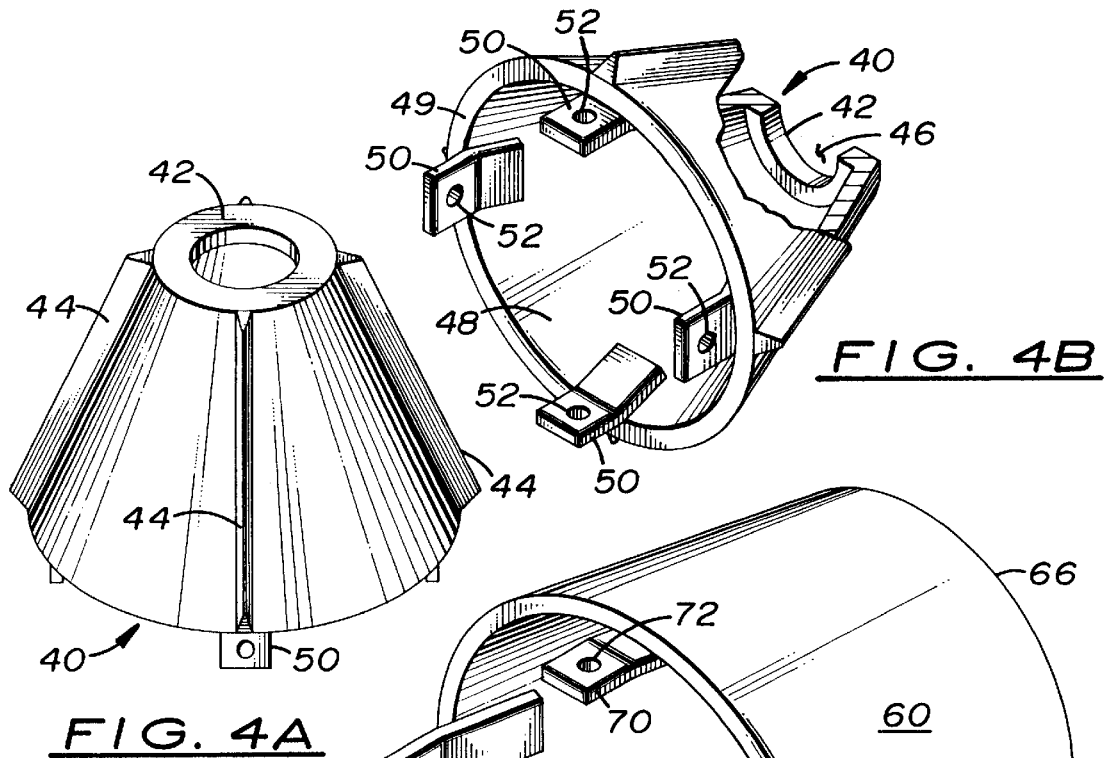
FIG. 4B
FIG. 4A
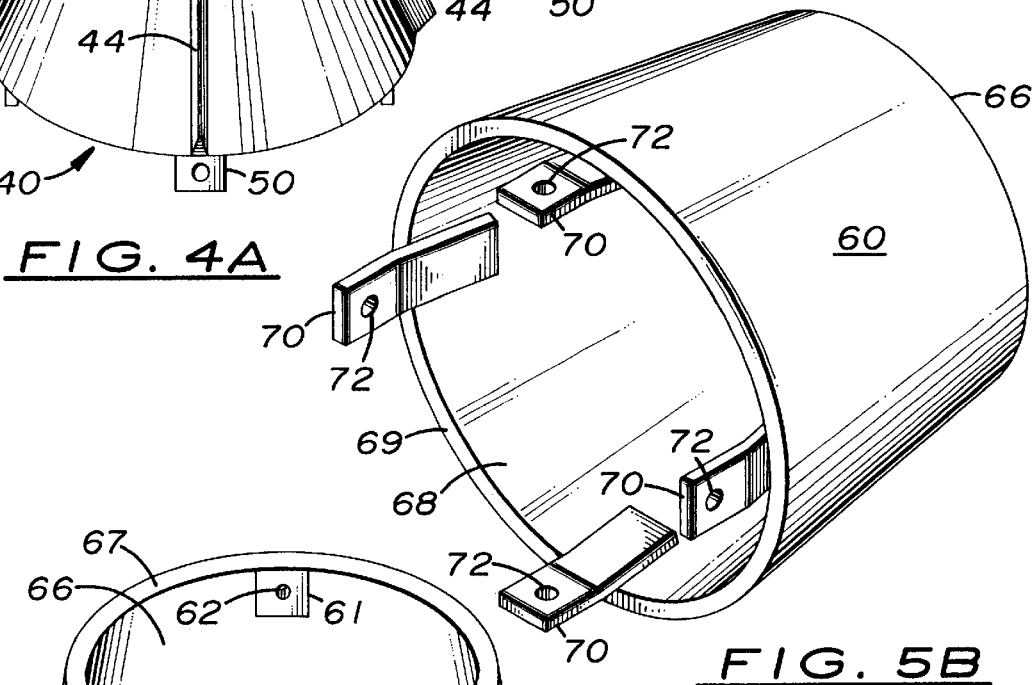
FIG. 5B
FIG. 5A

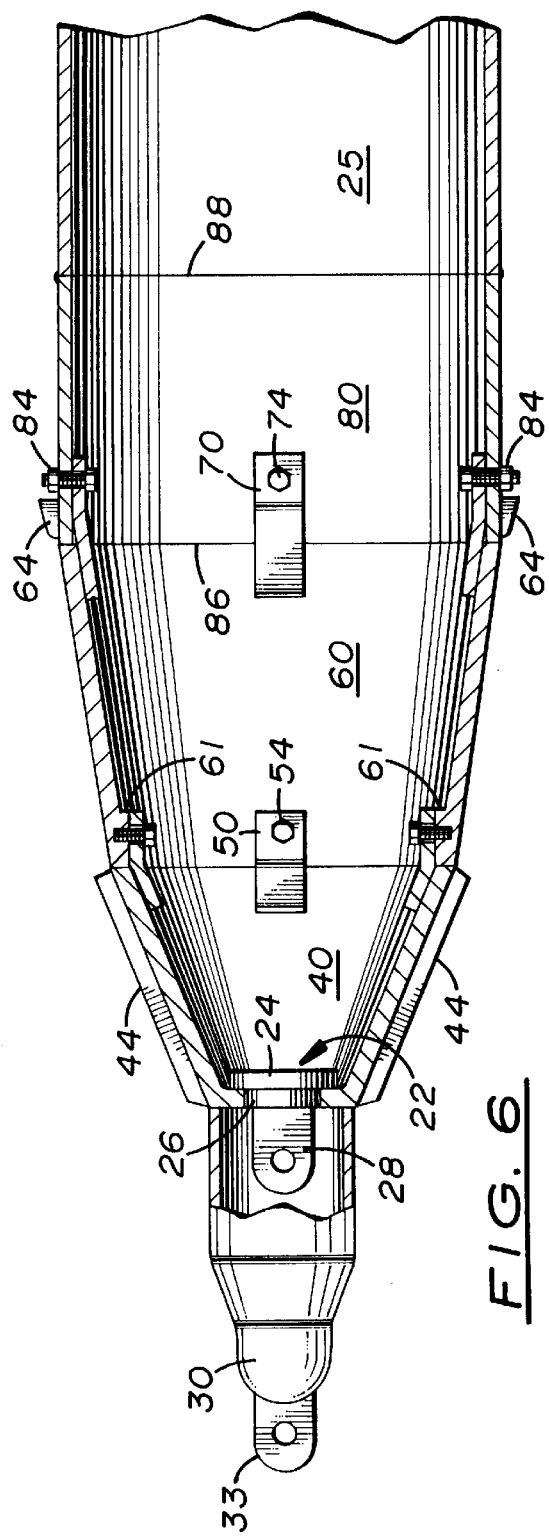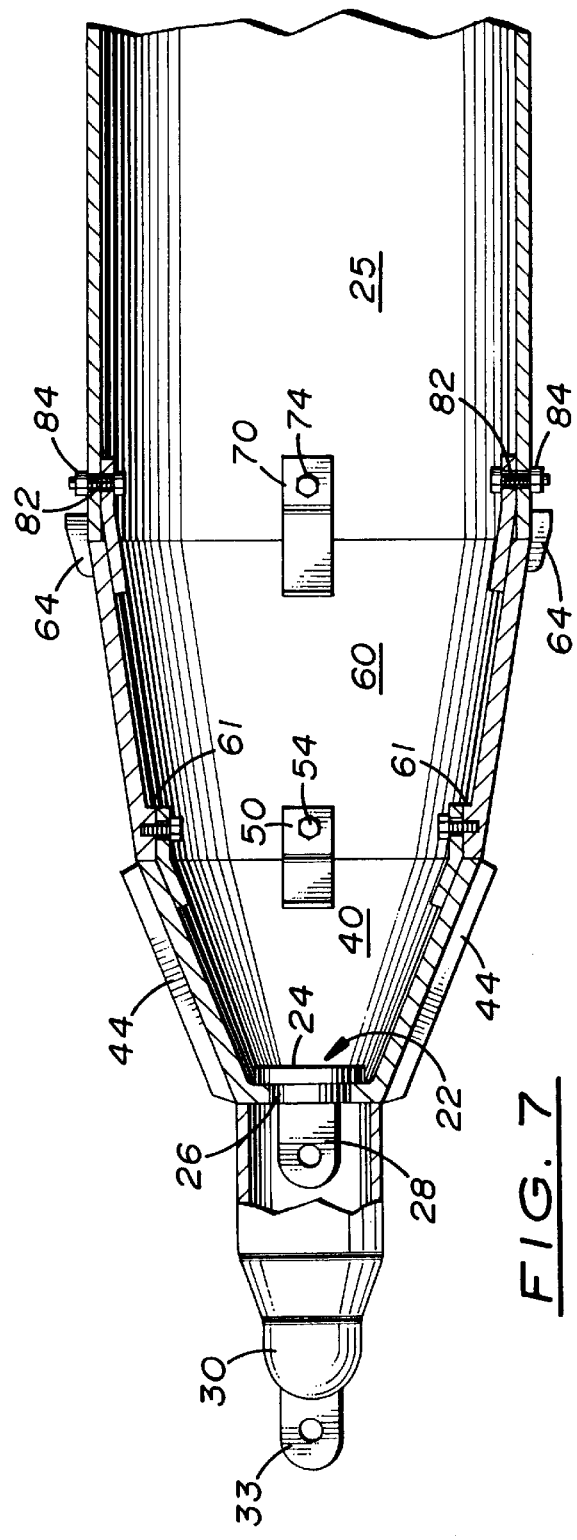

RAM BURSTER AND METHOD FOR INSTALLING TUBULAR CASING UNDERGROUND

FIELD OF THE INVENTION

This invention relates to techniques and apparatus for new installation or replacement of underground pipelines, gas mains, water and sewer lines and other service and utility conduits. The apparatus and method are for creating a tunnel to accommodate new piping, inserting the new piping, and doing so without the need to excavate the tunnel or excavate or enlarge any man-hole or utility vault along the line or to create large openings at the destination location. The apparatus can work with a pilot hole or with preexisting pipe. The original pipe can be any fracturable material. Also the apparatus and method allows for substantial enlargement of preexisting line opening and the subsequent or simultaneous use of a multitude of different types of piping materials, thus meeting the needs of utility companies like water providers to use standard materials for the use of their district.

BACKGROUND OF THE INVENTION

The underground location of lines and conduit for the many utilities in service today means that replacement of existing lines with new conduit lines is more complicated and necessitated due to age and deterioration, accidental breaks or population and usage growth making existing lines obsolete. Often the lines were installed with open trenches many years ago and subsequently new developments, such as roads, housing or landscaping have gone in over the surface, thus making re-excavation impossible or unacceptable. Also excavation methods are expensive in man power, equipment and risk of injury or damage.

There are numerous methods in use and available to replace old or outdated lines with new line material and without extensive excavation, but each has a variety of drawbacks or limitations. The commonly used method to replace pipe without excavation of which this invention is an improvement is called pipe bursting. Streaffield, U.S. Pat. No. 4,738,565 is one such method. It makes use of a conical shaped mole that is forced through an existing pipe and, in turn, pulls the new piping into the space. The bursting occurs when the mole is forced into the pipe. The mole is shaped such that it is smaller than the inside diameter of the old pipe at one end of the mole and larger than the inside diameter of the pipe at the other end of the mole and thus causes the original pipe to be fractured or, by other methods, cut. The object is to destroy and displace or remove the original pipe structure to then allow the new replacement pipe's structure to take the place of the original. Thus the new pipe replaces the old pipe without excavating along the entire length of the pipe being replaced.

The methods, such as the above, however, generally require that two excavations be made—one at the start of the pipe bursting and the second at the end. This then accomplishes the replacement in that section. If more than one section is to be replaced, then successive points of excavation are made to accommodate the equipment and tools used to force the mole to do its job. For the mole tool to be started in the correct manner at the start of the hole a large excavation is necessary and another large excavation is needed to allow the mole tool to be removed at the end joint. Most of the current methods make use of equipment and tools that require the end point to be excavated even if there is access through a manhole vault at the location because the removal of the tool at the end requires a larger opening than the manhole vault. This causes problems as the manholes themselves are expensive structures to replace. Usually a manhole vault is in the system and often is located in a roadway. The previous methods require excavation of the manhole or vault which means that the excavation will impede traffic while the excavation is made, used and finally replaced and repaired. The necessity to excavate in streets is often regulated by local government to prevent an unacceptable number or timing of street cuts. Thus construction projects may have to be delayed for city permits.

PRIOR ART DISCLOSURE STATEMENT

Boring machines are often used to create holes in soil without the necessity of digging trenches. These can be with ram like action such as percussive devices. See Chepurnoi, U.S. Pat. No. 3,952,813, where a hammer drives a pointed end piece through the soil. Also it is known to drive a hollow pipe through the soil, then evacuate the pipe to leave the pipe available for various uses. Alternately the bore may be created by a drilling head that drills the hole.

There are numerous methods to burst an existing pipe to be replaced by a new pipe, done in a single operation. These methods and apparatus use drill or cutting heads with hammer-like driving forces used to move the head and pull the replacement pipe into the newly created hole. These include Parish, U.S. Pat. No. 5,628,585, where the replacement pipe is polyorefin and the old pipe is cut, chipped and ground away by roller bits worked by a drive shaft, and also Granella, U.S. Pat. No. 5,403,122.

The use of pulling means to draw the bursting tool and new pipe is used in Gherrington, U.S. Pat. No. 5,456,552, Luksch, U.S. Pat. No. 5,076,731, Torielli, U.S. Pat. No, 5,192,165, and Moriarty, U.S. Pat. No. 5,302,053.

Alternately, the bursting tool and pipe may be driven by a hammer that fits inside the pipe such as in Fisk, U.S. Pat. No. Re 35,271 and U.S. Pat. No. Re 35,542, and Kayes, U.S. Pat. No. 5,480,263, and Streatfield, U.S. Pat. No. 4,738,565 which also alternatively uses a pulling method.

Some methods make use of ramming force exerted at the bursting head through a hydraulic or pneumatic force applied inside the piping. As the head advances new sections of pipe are added and pushed forward—not as the force to move the head but merely to advance the new pipe in conjunction with the head. See, Tenbusch, U.S. Pat. No. 5,482,404.

All of the above methods have deficiencies. None address the issues of pipe bursting into a confined location to avoid having extensive and expensive excavation at the exit point or the ability to increase the size of the pipe substantially.

SUMMARY OF THE INVENTION

The present invention, techniques and apparatus are disclosed for installing new pipe or replacing old pipe with new pipe of the same or larger diameter, in such a manner as to be able to do the installation without trenching and also allowing the installation to be to a vault or man hole without the necessity of destroying the man hole or vault, or excavating a large hole at the man hole location.

The features of the present invention allows for forces being applied from the rear as in a ramming force, from the front as in a pulling force or a combination of these, all dependent upon the circumstances to be dealt with. The apparatus has a bursting ram that breaks up the old pipe or enters a pilot hole and expands the opening to the required size. The tubular casing is installed and inserted in the new opening at the same time. The bursting ram has a fracturing mandrel with a front opening that is fitted with a floating eye. When being pulled the floating eye covers the front opening. A cap may cover the floating eye. At the end of the job the floating eye is released allowing the front opening to be opened for access to the interior of the bursting ram for disassembly of the apparatus.

In some circumstances the fracturing mandrel is attached to the casing. In other circumstances, the fracturing mandrel is connected to an expansion mandrel for further enlarging the hole. Also there can be a carrier ring of the same diameter as the casing to allow for easy field installation. As the assembly is driven into the vault, the components are disassembled thus allowing for the removal of the bursting ram in limited space.

An alternate embodiment, where there is no pulling force applied, entails a centering head that removably covers the front opening of the fracturing mandrel.

The centering head is disassembled, which then in turn allows access to the interior for disassembling the bursting ram.

BRIEF DESCRIPTION OF THE DRAWINGS

FIG. 2A is a profile view of the floating eye;

FIG. 2B is a perspective view of the floating eye;

FIG. 2C is a perspective view of the centering cap holding the floating eye;

FIGS. 3A and 3B are side views of the centering cap;

FIG. 3C illustrates an alternative embodiment of the centering cap and mating lip of the fracturing mandrel;

FIG. 4A is a perspective view of the fracturing mandrel;

FIG. 4B is a cutaway perspective view of the fracturing mandrel;

FIGS. 5A and 5B are perspective views of the expansion mandrel;

FIG. 6 is a cutaway profile view illustrating the carrier ring connected between the casing and the bursting ram;

FIG. 7 is a cutaway profile view illustrating the bursting ram connected directly to the casing;

DETAILED DESCRIPTION OF THE DRAWINGS

Figure 1A:
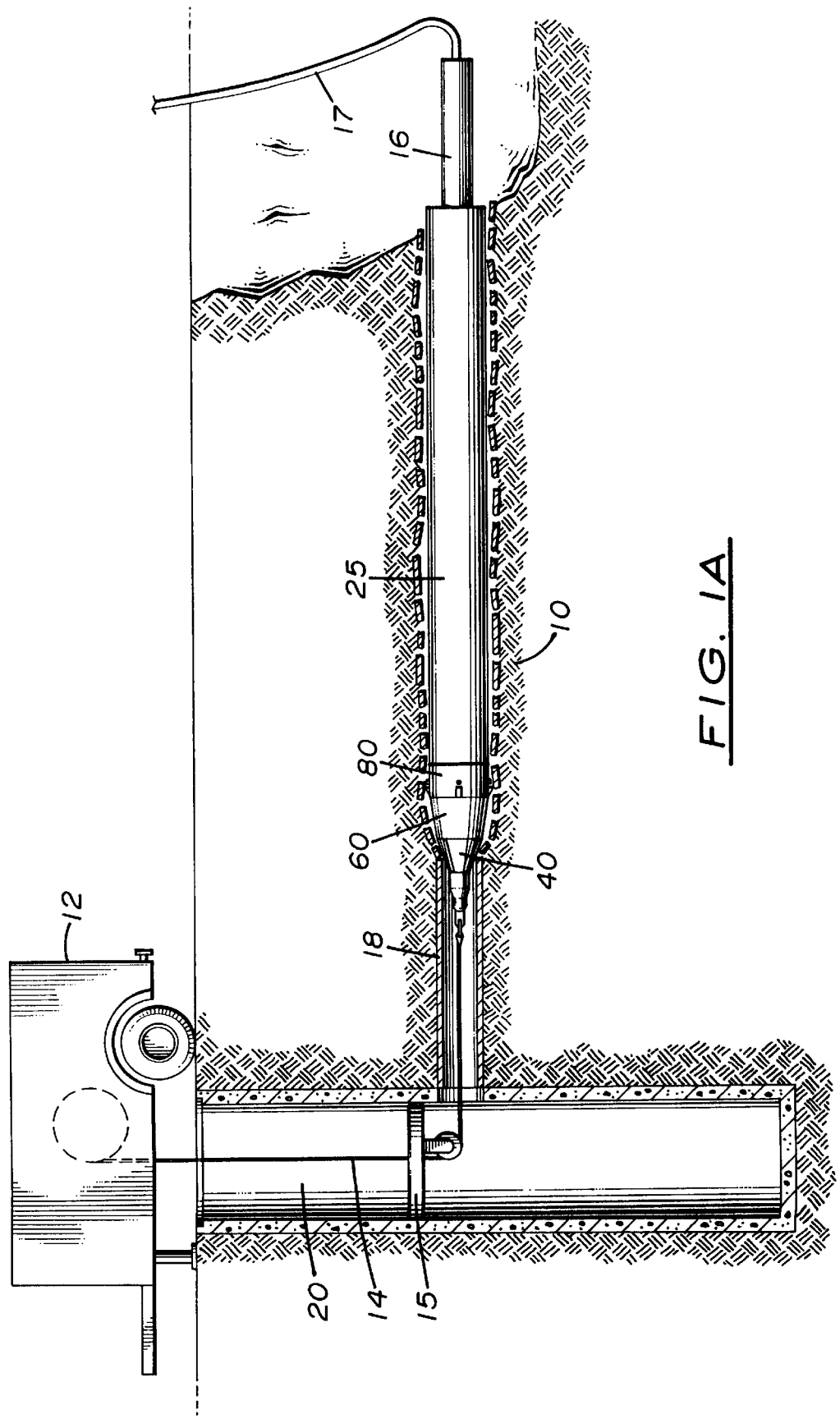
FIG. 1A is a side view of the bursting ram as utilized to replace pipe with casing.

As shown in FIG. 1A, the bursting ram 10 may be used to fracture and expand existing pipe 18, while replacing the fractured debris with new casing 25. The bursting ram 10 may be driven percussively by a hydraulic or pneumatic hammer 16 or other driving apparatus, acting on the end of the casing, or drawn through the existing pipe 18 by a rope, chain or cable 14 connected to winch 12, or utilize both methods in combination. The bursting ram 10 may comprise several detachable sections, thus allowing the bursting ram 10 to be disassembled and removed from a manhole or vault 20 without excavation. A fracturing mandrel 40 may be coupled with one or more expansion mandrels 60, and may include a floating eye 22 and a centering cap 30. A carrier ring 80 may be attached to the rear aperture 68 of the expansion mandrel 60 or the rear aperture of the fracturing mandrel to provide an interface between the bursting ram 10 and the casing 25.

A floating eye 22 may be provided near the front of the bursting ram 10 to provide a connection point for cable 14. As illustrated in FIGS. 2A and 2B, the floating eye 22 comprises a flanged plate 24 attached in a perpendicular relationship to a connecting eye 28. The flanged plate 24 may include a recessed edge 26 along its periphery, thus allowing the floating eye 22 to mate securely with the fracturing mandrel 40 when placed inside the fracturing mandrel 40 and brought in contact with a flanged mating lip 42 located at the forward aperture 46. When the floating eye 22 and fracturing mandrel 40 are configured in this manner, the connecting eye 28 protrudes from the front of the bursting ram 10 and presents a connecting point by which the cable 14 may be attached to the bursting ram 10. The tension in the cable 14 maintains a seal between the flanged plate 24 and the mating lip 42, thus preventing dirt or debris from entering the bursting ram 10 and casing 25. When tension in the cable 14 is released, the floating eye 22 may be easily dislodged backward into the fracturing mandrel 40 to allow disassembly of the bursting ram 10 through the forward aperture 46.

In the preferred embodiment a centering cap 30 may be provided as an alternative attachment point for the drawing means or as an alignment guide for the bursting ram 10, and assist the centering of the bursting ram 10 within the existing hole or pipe 18. A handling eye 33, is the attachment point, fabricated from a flanged section of steel or other suitable material and having a central bore, may be attached at the forward point of the centering cap 30 and used for handling the centering cap 30. When used in combination with the floating eye 22, the centering cap 30 may be placed over the connecting eye 28 adjacent to the forward aperture 46 of the fracturing mandrel 40. The centering cap 30 may be secured by placing a threaded bolt 31 through a recessed bore 32 in the side of the centering cap 30, through the connecting eye 28, and fastening the bolt 31 to a threaded nut 38 placed in a recessed bore 34 on the opposite side of the centering cap 30 (FIGS. 3A and 3B). Alternatively, when there is no pulling means and when the centering cap 30 includes a threaded connection 35 as shown in FIG. 3C, the floating eye 22 is not necessary and the centering cap 30 may connect directly to the threaded mating lip 43 in fracturing mandrel 40.

FIGS. 4A and 4B illustrate the fracturing mandrel 40. The fracturing mandrel 40 is the portion of the bursting ram 10 that fractures the existing pipe 18. The fracturing mandrel 40 may have a frusto conical shape that extends from a forward aperture 46 to a larger, rear aperture 48. Other tapered shapes may be used for the fracturing mandrel means, provided it has a rear interface sufficiently shaped to connect to the casing 25, expansion mandrel 60, or carrier ring 80. The forward aperture 46 may incorporate the mating lip 42 that mates with the flanged plate 24 of the floating eye 22. Fracturing surfaces 44, attached at a plurality of points along the outside surface of the fracturing mandrel 40 and extending lengthwise along the outside surface of its body, incorporate raised surfaces extending radially outward from the outer surface of the body of the bursting ram 10. The tapered body of the fracturing mandrel 40 directs force to the existing pipe 18 or bore walls in a radially outward direction, with the force concentrated on the edges of the fracturing surfaces 44 where the fracturing surfaces 44 meet the inner surface of the existing pipe 18. The fracturing surfaces 44 also help prevent the bursting ram 10 from twisting as it is driven or drawn through the existing pipe 18. The fracturing surfaces 44 may also be arranged to protect fasteners used to connect the fracturing mandrel 40 to the casing 25 or carrier ring 80 in the event that an expansion mandrel 60 is not used. A coupling attachment provided at the rear aperture 48 on the inside surface of the fracturing mandrel 40 attaches the fracturing mandrel 40 to the expansion mandrel 60. The coupling attachment may comprise rigid tongues 50 attached to the inner surface of the body of the fracturing mandrel 40 that extend out from the rear aperture 48.

Alternatively, the attachment may be a notched or circular surface on the rear aperture of the fracturing mandrel that has a step contour to fit inside the casing or to mate with the front aperture of an expansion mandrel. The connection may be secured by two or more bolts to go through bores in the fracturing mandrel and the casing, fracturing mandrel with the expansion mandrel or expansion mandrel with the casing. The bolts would either seat into threaded bores or onto nuts. Other means of securing the connection may include latches or other mechanical means suitable to the circumstance of whether the bursting ram is being pulled or pushed.

A bore 52 is included through the exposed portion of each tongue 50, which aligns with threaded bores 62 on the inside surface of the expansion mandrel 60 or bores with nuts when the forward aperture 66 of the expansion mandrel 60 is placed adjacent to the rear aperture 48 of the fracturing mandrel 40. The fracturing mandrel 40 is attached to the expansion mandrel 60 by placing threaded bolts 54 through the bores 52 and fastening them into the threaded bores 62 in the expansion mandrel 60. In instances where the pneumatic hammer 16 or other driving apparatus is attached to the casing 25 to drive the bursting ram 10 through pipe or pilot holes, force is transmitted axially from the forward face of the casing 25 or carrier ring 80 to the rear face 69 of the expansion mandrel 60, and from the forward face 67 of the expansion mandrel 60 to the rear face 49 of the fracturing mandrel 40.

The expansion mandrel 60 displaces the fractured pieces of pipe 18 or bore walls and enlarges the existing hole. While FIGS. 6 and 7 show the expansion mandrel 60 having a taper with a smaller angle from the central axis than the taper of the fracturing mandrel 40, the expansion mandrel 60 could have a larger angle or the same angle as the fracturing mandrel 40 to create a continuous tapered edge between the two mandrels. Directing attention to FIGS. 5A and 5B, the body of the expansion mandrel 60 has a frusto conical shape similar to the shape of the fracturing mandrel 40, with a body slightly larger in diameter than the body of the fracturing mandrel 40. The forward aperture 66 of the expansion mandrel 60 is of similar diameter and shape as the rear aperture 48 of the fracturing mandrel 40, thus presenting a suitable mating edge. Raised surfaces 61, located on the inner surface of the expansion mandrel 60 near the forward aperture 66, contain threaded bores 62 that align with the tongues 50 and bores 52 of the fracturing mandrel 40. The body of the expansion mandrel 60 expands to a diameter at the rear aperture 68 that is approximately the same diameter as the casing 25 to be installed. A coupling attachment similar to that of the fracturing mandrel 40 is provided at the rear aperture 68 of the expansion mandrel 60, and attaches the expansion mandrel 60 to the casing 25, or to carrier ring 80 that attaches the casing 25 and expansion mandrel 60. The tongues 50 in the preferred embodiment are angled as to protrude from the rear aperture 68 of the expansion mandrel 60 in a substantially parallel relationship with the central axis of the casing 25.

Carrier ring 80 may be provided as an interface between the bursting ram 10 and the first section of casing 25 to be installed. In the preferred embodiment, the carrier ring 80 is a cylindrical section of casing that includes a forward aperture 86 and a rear aperture 88. The carrier ring 80 provides a detachable connection at the forward aperture 86 for the expansion mandrel 60, and the rear aperture 88 may be welded to the first section of casing 25 that is to be installed. Upon completion of a bursting operation, the expansion mandrel 60 may be detached from the carrier ring 80, leaving the carrier ring 80 in the ground as part of the casing 25. The carrier ring 80 has bores 82 located near the forward aperture 86 that align with the bores 72 in the tongues 70 when the expansion mandrel 60 is placed adjacent to the carrier ring 80. The carrier ring 80 may be fitted and removably installed at any convenient location to provide quick and easy assembly at the job site. Because the carrier ring 80 in the preferred embodiment is fabricated from a section of casing 25 that has a wall thickness of approximately 0.5 inch, it is desirable to weld threaded nuts 84 on the outside surface of the carrier ring 80 directly over the bores 82. The expansion mandrel 60 and carrier ring 80 are fastened together by placing threaded bolts 74 through bores 72 and bores 82 and fastening them into the threaded nuts 84. To protect the threaded nuts 84, protective fins 64 may be attached to the outside surface of the carrier ring 80 forward of each threaded nut 84. The protective fins 64 are wedge shaped pieces that extend outward and rearward from the surface of the carrier ring 80 (FIG. 6). The protective fin 64 has a width approximately the diameter of the threaded nut 84, and it extends radially outward from the outer surface of the carrier ring 80 to approximately the height of the threaded nut 84. In the event that the carrier ring 80 is not used, and the bursting ram 10 is connected directly to a section of casing 25, the protective fins 64 may be attached to the casing section or to the expansion mandrel 60, and the casing section may incorporate bores 82 and threaded nuts 84 welded to its outer surface (FIG. 7).

Figure 8:
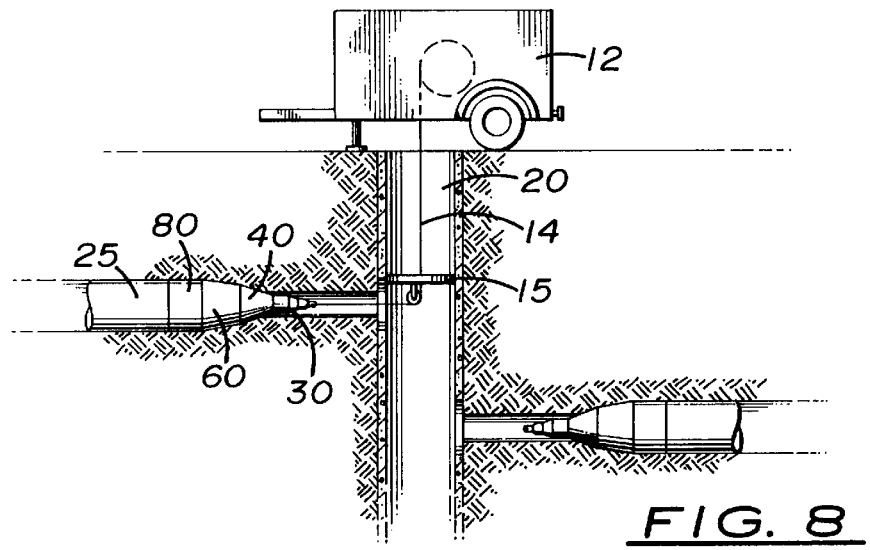
FIG. 8 is a side view of the bursting ram as utilized to install casing from different directions and terminating at a vault.
Figure 9A:
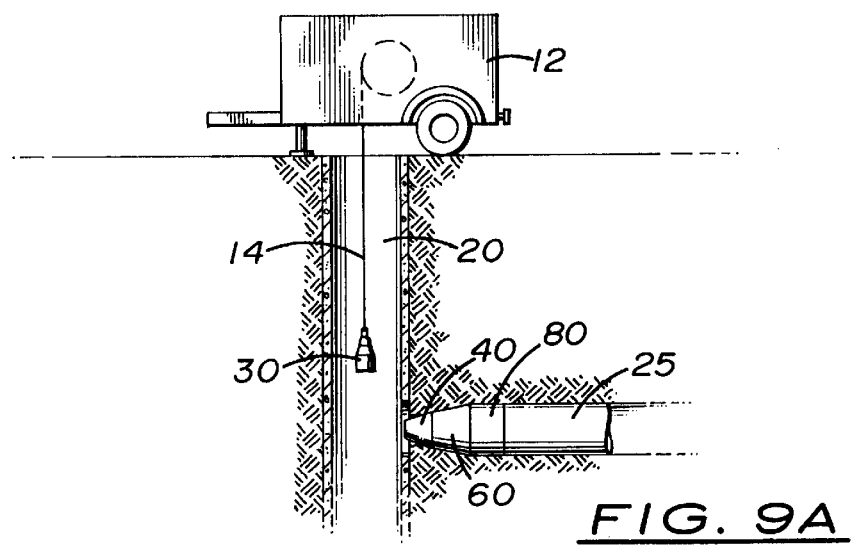
FIGS. 9A through 9E are side views illustrating in stages the disassembly and removal of the bursting ram from a vault.
Figure 9B:
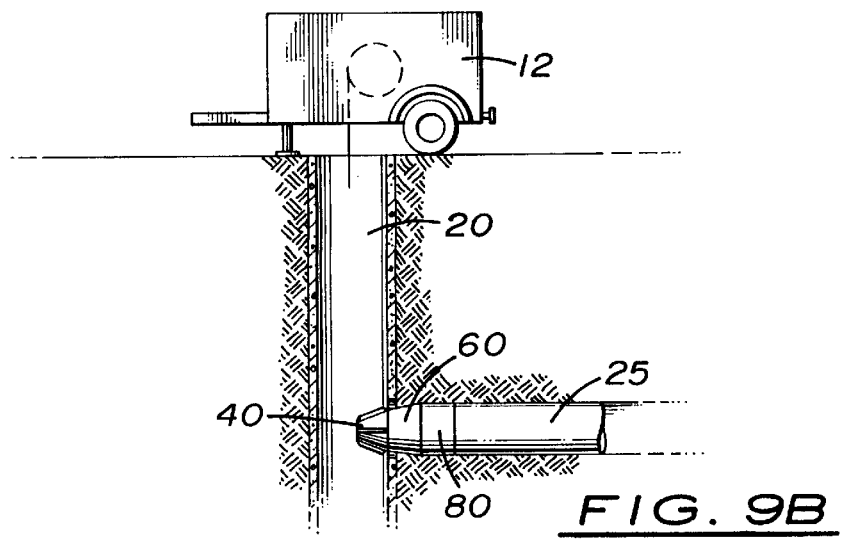
Figure 9C:
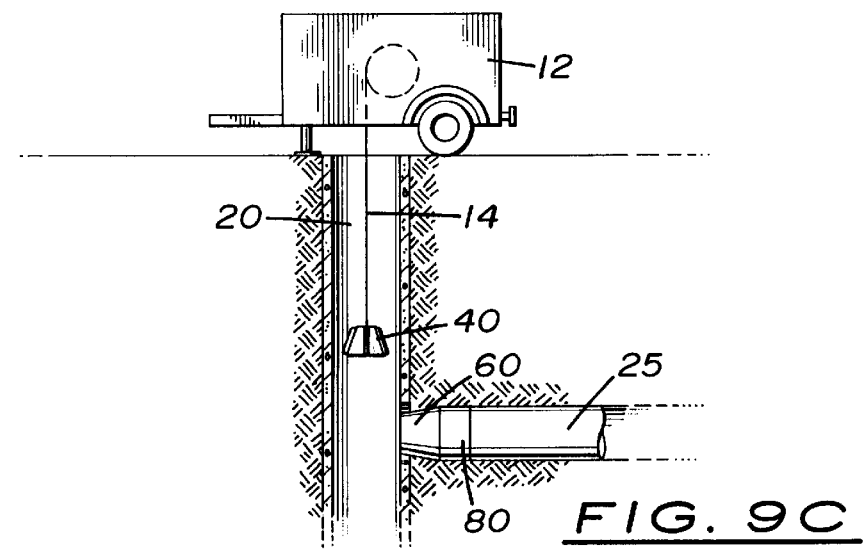
Figure 9D:
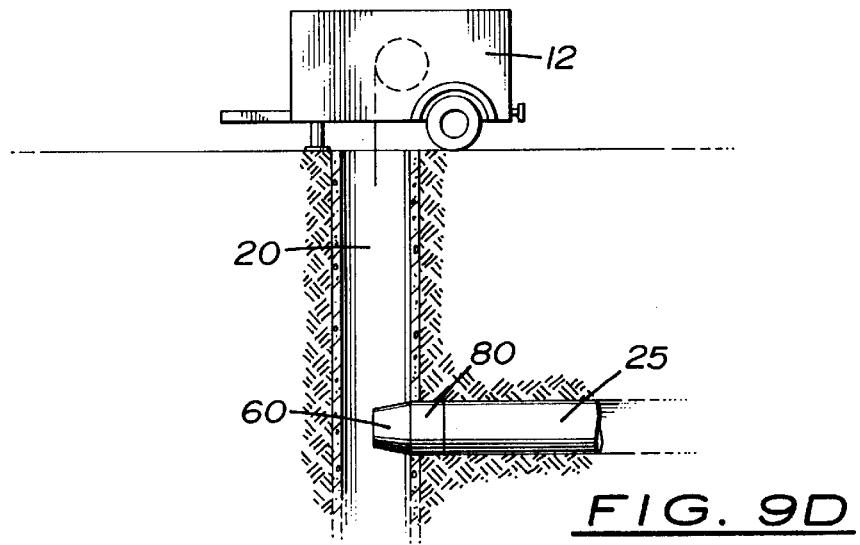
Figure 9E:
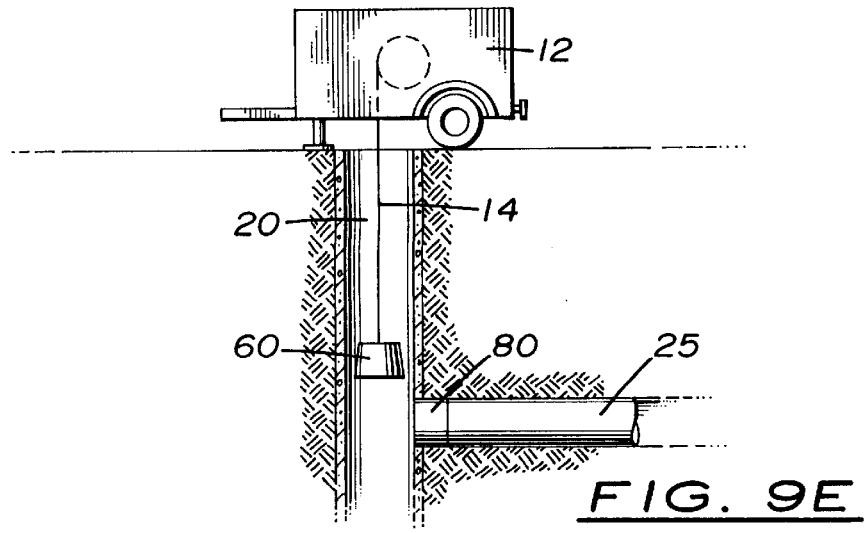

The detachable sections allow the bursting ram 10 to be disassembled and removed from a vault 20 or other confined space without requiring excavation in an inconvenient area, such as the middle of a busy street. In the event that a bursting operation is required beneath a street, building or other area where excavation would be costly and disruptive, an entry excavation may be performed at a more desirable location, such as a nearby parking lot or other vacant area. The entry excavation provides an entry point for the bursting ram 10 and casing 25, and allows long sections of casing 25 to be attached to the bursting ram 10, thus minimizing the number of couplings that are made of the casing and any inserted conduit or utilities. The entry excavation also provides the required clearance for powerful equipment to be attached to casing 25 to drive the bursting ram 10 and casing 25 through the existing pipe 18. If the winch 12 is required, the cable 14 may be fed through cable pulley 15, located in the vault, flowed or blown through the existing pipe 18, and attached to the bursting ram 10. The bursting ram 10, attached to the carrier ring 80 or directly to the first section of casing 25 to be installed, is placed at the opening of the existing pipe 18, and attached to the connecting eye 28 on the floating eye 22, or on the handling eye 33 on the centering cap 30. A hydraulic hammer or pneumatic hammer 16 or other driving apparatus may be attached at the end of the first section of casing 25 to be installed. The pneumatic hammer 16 is powered by supplying compressed air to its back end via air hose 17, which percussively drives the pneumatic hammer 16 against the casing 25. The bursting operation begins when the winch 12 creates tension in the cable 14 or the pneumatic hammer 16 is operated. Once the bursting ram 10 and first section of casing 25 are driven into the existing pipe 18, the next section of casing 25 is welded or otherwise attached to the preceding section. This process continues until the desired length of existing pipe 18 has been burst and replaced with casing 25 and the bursting ram 10 has been driven to a convenient removal point, such as vault 20. Existing sections of pipe 18 often approach a vault from different angles or may be offset as shown in FIG. 8. The pipelines may be aligned, but in order to preserve the integrity of the vault, the bursting ram 10 may be used from opposite directions to replace both sections of pipe 18. The only preparation required in the vault is to chisel out suitable openings for the new casing. Once the bursting ram 10 has been driven until the centering cap 30 has entered the vault 20, the centering cap 30 may be detached from the fracturing mandrel 40 and removed from the vault 20 (FIG. 9A). The casing 25 is driven farther until the fracturing mandrel 40 is completely within the vault 20 (FIG. 9B). At this point, the floating eye 22 is dislodged into the body of the fracturing mandrel 40 and access to the threaded bolts 54 is provided through the forward aperture 46 of the fracturing mandrel 40. Once the threaded bolts 54 are removed from the threaded bores 62 of the expansion mandrel 60, the fracturing mandrel 40 may be detached from the expansion mandrel 60 and both the fracturing mandrel 40 and floating eye 22 are removed from the vault 20 (FIG. 9C). The casing 25 is driven farther until the expansion mandrel 60 is within the vault 20 (FIG. 9D). At this point, the forward aperture 66 of the expansion mandrel 60 provides access to the threaded bolts 74, which are then removed from the threaded nuts on the outside surface of the carrier ring 80. The expansion mandrel 60 is then removed from the vault 20 and the carrier ring 80 remains attached to the casing 25 (FIG. 9E). In the case where only a winch 12 is used, the bursting ram 10 is pulled all the way into the vault and then disassembled. Where the winch 12 is used with the pneumatic hammer 16 or other ramming apparatus, the disassembly can occur as in the circumstance where a ramming method is used.

In the case where the vault 20 is located in the middle of a street and winch 12 is used, the winch 12 only needs to be placed over the vault 20 while the bursting operation is proceeding. Traffic may be diverted around the winch 12 during the bursting operation, and the normal flow of traffic may be quickly restored after the winch 12 is removed and the bursting ram 10 is retrieved from the vault 20.

Figure 1B:
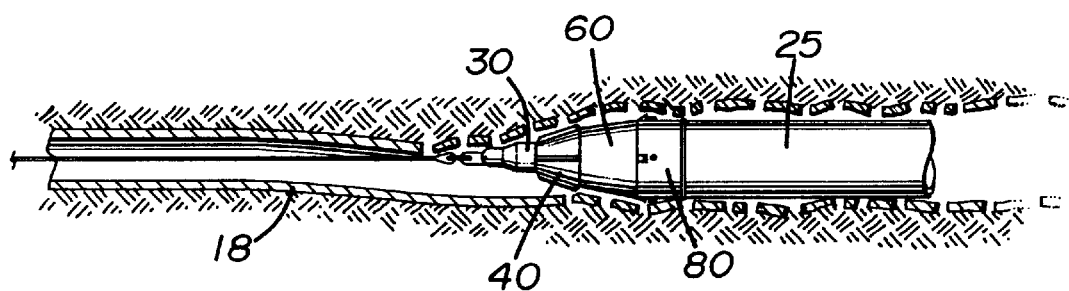
FIG. 1B is a side view of the bursting ram as utilized to repair bellies in pipelines.

As illustrated in FIG. 1B, the bursting ram 10 may be used to replace sections of ruptured pipe or bellies, where dips occur in the pipeline due to changes in the soil condition resulting from settling, construction, or other events. The bursting ram 10 repairs bellies in pipelines by replacing the pipe with casing 25 delivered in a straight course.

Figure 1C:
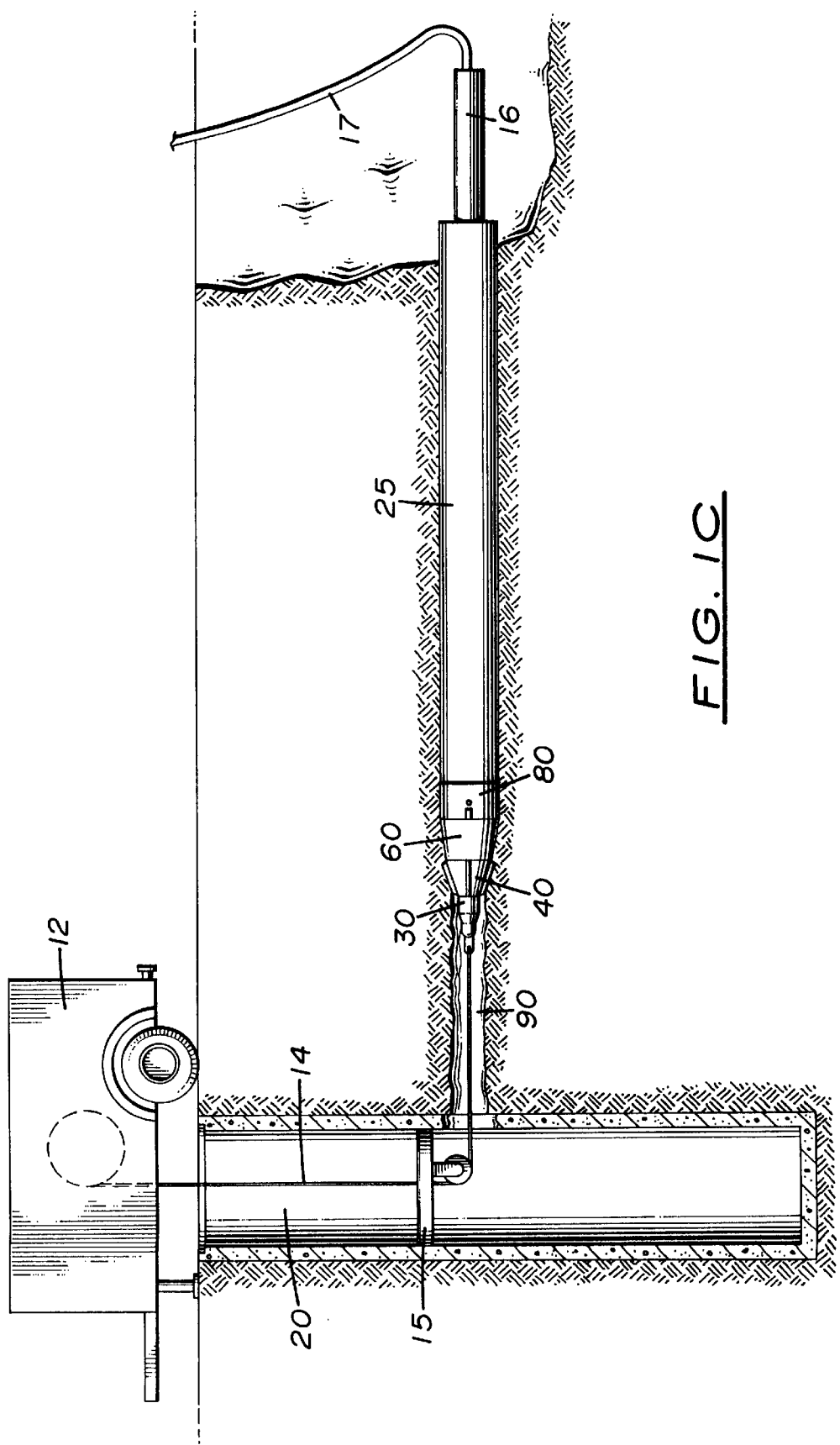
FIG. 1C is a side view of the bursting ram as utilized to install casing in a bored hole.

While the above description has focused on bursting existing pipe and replacing it with casing, the bursting ram 10 may also be used to install casing 25 in a bored pilot hole where no pipe exists. In this type of application, illustrated in FIG. 1C, the bursting ram 10 expands the pilot hole 90 to a diameter capable of receiving the casing 25.

Once the casing 25 has been installed and the bursting ram 10 has been removed, the casing 25 may be slip lined with high density polyethylene, PVC, ductile iron, or other suitable material. Techniques for slip lining casing 25 are well known in the art and do not require discussion here. The installed casing 25 may also be used for applications other than plumbing, such as routing underground power lines, telecommunication lines, or other similar applications.

The method also allows for installing the lining materials at the same time as the sections of casing 25 are installed, thus saving time and operations. In addition, casing 25 with selected lining material attached or bonded to the inside wall of the casing 25 can be used. In making use of such casing the coupling method of the sections of casing necessarily must protect the integrity of the lining. Screw coupling of casing would be the preferred coupling.

The bursting ram 10 may be used to burst any fracturable material and may be used in any condition where the material surrounding the pipe or bore may be compressed. In the preferred embodiment, the fracturing mandrel 40 and expansion mandrel 60 are fabricated from mild, carbon, or hardened steel having a thickness of approximately 0.75 inch, but other materials of varying thicknesses may be used, provided they have sufficient strength to withstand the pressure of the fracturing operation, or are suitable for boring when the bursting ram 10 is driven through pilot hole 90 without existing pipe. For applications where the objective is to replace 10 inch pipe with 18 inch casing, in the preferred embodiment, the centering cap 30 is approximately 12 inches long, and has an initial diameter of approximately four inches. The body of the centering cap 30 tapers to a diameter of approximately 6 inches. The forward aperture 46 of the fracturing mandrel 40 has a diameter of approximately 6 inches and the rear aperture 48 has a diameter of approximately 14 inches. The length of the fracturing mandrel is approximately 10 inches. The forward aperture 66 of the expansion mandrel 60 has a diameter of approximately 14 inches, and the rear aperture 68 has a diameter of approximately 18 inches. The length of the expansion mandrel 60 is approximately 13 inches.

However, the dimensions and apex angles of the fracturing mandrel 40 and expansion mandrel 60 may be modified so that casings of different dimensions may be used. Conversely, more sections may be added to the bursting ram 10 to allow expansion to greater diameters. However, each section should have sufficient dimensions to be removed from the vault, and should include attachment couplings to connect each section to adjacent sections.

While an improved apparatus for bursting underground pipelines and expanding holes while installing casing has been shown and described in detail in this application, it is to be understood that this invention is not to be limited to the exact form disclosed and changes in detail and construction of the various embodiments of the invention may be made without departing from the spirit thereof.

What is claimed is:

1. A bursting ram for replacing underground pipelines or holes with casing having a diameter which equals or exceeds a diameter of said underground pipelines or holes, said bursting ram comprising:

a) a fracturing mandrel means for bursting pipe and expanding holes, said fracturing mandrel means having an outer surface and said fracturing mandrel means having a body having a tapered shape with a diameter increasing from a front aperture to a rear aperture; and b) a connection means for detachably connecting said bursting ram to said casing, wherein said diameter of said fracturing mandrel means at said rear aperture is equal to or less than said diameter of said casing, and c) having a covering means, said covering means detachably connected to said fracturing mandrel means to at least partially enclose said front aperture.

2. The bursting ram as defined in claim 1, wherein said bursting ram includes a connection means for attaching said bursting ram to a drawing means such that said bursting ram may be pulled through said underground pipelines or holes.

3. The bursting ram as defined in claim 1, wherein said covering means comprises a centering means for centering said bursting ram within said pipelines or holes.

4. The bursting ram as defined in claim 1, wherein said fracturing mandrel means further comprises one or more interacting surfaces for contacting material to be burst or expanded, said one or more interacting surfaces protruding radially from said outer surface of said body of said fracturing mandrel means.

5. The bursting ram as defined in claim 4, wherein said one or more interacting surfaces comprise blades running lengthwise along said outer surface of said body of said fracturing mandrel means.

6. The bursting ram as defined in claim 1, further comprising a cylindrical inter face attached between said fracturing mandrel means and said casing, and cylindrical interface having substantially the same diameter of said casing, said cylindrical interface having a front aperture and a rear aperture, and a connection means for detachably connecting said fracturing mandrel means, said connection means located proximate to said front aperture of said cylindrical interface, said cylindrical interface attached to said casing to become part of said casing after being installed by said bursting ram.

7. The bursting ram as defined in claim 6, wherein said cylindrical interface includes protective means for protecting said connection means, said protective means protruding radially from the outer surface of said cylindrical interface and located anteriorly proximate to said connection means of said cylindrical interface.

8. The bursting ram as defined in claim 6, wherein said fracturing mandrel includes protective means for protecting said connection means, said protective means protruding radially from the outer surface of said fracturing mandrel and located anteriorly proximate to said connection means of said fracturing mandrel.

9. The bursting ram as defined in claim 1, further comprising at least one expansion mandrel means, the smallest diameter expansion mandrel means comprising a body having a frusto conical shape having a diameter increasing from a front aperture to a rear aperture, said expansion mandrel means having said front aperture diameter approximately equal the diameter of the rear aperture of said fracturing mandrel means, in the event of one or more additional and successively larger expansion mandrels, they will have a shape similar to the first, with the mandrel's front aperture equal to the rear aperture of the preceding and next smaller mandrel's rear aperture, with the largest diameter expansion mandrel's rear aperture equal to the casing diameter, said expansion mandrel means having connection means for detachably connecting said expansion mandrel means between said fracturing mandrel means and said casing or successive expansion mandrel means, wherein said diameter of said expansion mandrel means at said rear aperture is equal to or less than said diameter of said casing.

10. The bursting ram as defined in claim 9, further comprising a cylindrical interface attached between the largest diameter expansion mandrel means and said casing, said cylindrical interface having substantially the same diameter of said casing, said cylindrical interface having a front aperture and rear aperture, and a connection means for detachably connecting said cylindrical interface to said expansion mandrel means, said connection means located proximate to said front aperture of said cylindrical interface, said cylindrical interface attached to said casing to become part of said casing after being installed by said bursting ram.

11. The bursting ram as defined in claim 10, wherein said cylindrical interface includes protective means for protecting said connection means of said cylindrical interface, said protective means protruding radially from the outer surface of said cylindrical interface and located anteriorly proximate to said connection means of said cylindrical interface.

12. The bursting ram as defined in claim 9, wherein said expansion mandrel means includes protective means for protecting said connection means of said expansion mandrel means, said protective means protruding radially from the outer surface of said expansion mandrel means and located anteriorly proximate to said connection means of said expansion mandrel means.

13. The bursting ram as defined in claim 1, wherein said fracturing mandrel means includes protective means for protecting said connection means of said fracturing mandrel means, said protective means protruding radially from the outer surface of said fracturing mandrel means and located anteriorly proximate to said connection means of said fracturing mandrel means.

14. A method for installing tubular casing underground, said method comprising the steps of:
   a) placing a bursting ram at an entry point to a hole underground in a substantially horizontal direction, said hole having a diameter equal or smaller than a diameter of said casing, said bursting ram comprising:
      1) a fracturing mandrel means, said fracturing mandrel means having an outer surface and said fracturing mandrel means with a body having a tapered shape with a diameter increasing from a front aperture to a rear aperture, said body having a diameter at said rear aperture exceeding the diameter of said hole and equal to or less than said diameter of said casing;
      2) a covering means, said covering means detachably connected to said fracturing mandrel means to at least partially enclose said front aperture; and
      3) a detachable connection means for connecting said fracturing mandrel means to said casing, said detachable connection means located proximate to said rear aperture;
   b) attaching a first length of casing to said detachable connection means;
   c) attaching a drawing means to said fracturing mandrel means via a cable means and pulling said bursting ram and casing through said hole;
   d) attaching additional lengths of casing to said first length of casing as necessary until said bursting ram exits said hole and said casing is placed in said hole; and
   e) disassembling and detaching said bursting ram from said first length of casing as said bursting ram exits said hole.

15. The method for installing tubular underground casing as described in claim 14, further comprising the step of slip lining said casing with material suitable for fluid handling applications.

16. The method for installing tubular underground casing as described in claim 15, further comprising the step of installing the lining at essentially the same time as the casing is installed.

17. The method for installing tubular underground casing as described in claim 14, further comprising a sectional casing that has a suitable lining material attached to an inner wall of said sectional casing with coupling means for said sectional casing that will not damage said lining.

18. The method for installing tubular underground casing as described in claim 17, further comprising a threaded coupling means between casing sections.

19. The method for installing tubular underground casing as described in claim 14, further comprising the step of pulling conduit through said casing.

20. The method for installing tubular underground casing as described in claim 14, further comprising the step of attaching a cylindrical interface between said fracturing mandrel means and said first length of casing, said cylindrical interface having substantially the same diameter of said casing, said cylindrical interface having a front aperture and a rear aperture, and a connection means for detachably connecting said fracturing mandrel means, said connection means located proximate to said front aperture of said cylindrical interface, said cylindrical interface permanently attached to said first length of casing to become part of said casing after being installed by said bursting ram.

21. The method as defined in claim 14, further comprising at least one expansion mandrel means, the smallest diameter expansion mandrel means comprising a body having a frusto conical shape having a diameter increasing from a front aperture to a rear aperture, said expansion mandrel means having said front aperture diameter approximately equal the diameter of the rear aperture of said fracturing mandrel means, in the event of one or more additional and successively larger expansion mandrels, they will have a shape similar to the first, with the mandrel's front aperture equal to the rear aperture of the preceding and next smaller mandrel's rear aperture, with the largest diameter expansion mandrel's rear aperture equal to the casing diameter, said expansion mandrel means having connection means for detachably connecting said expansion mandrel means between said fracturing mandrel means and said casing or successive expansion mandrel means, wherein said diameter of said expansion mandrel means at said rear aperture is equal to or less than said diameter of said casing.

22. The method for installing tubular underground casing as described in claim 21, further comprising the step of attaching a cylindrical interface between the largest diameter expansion mandrel means and said first length of casing, said cylindrical interface having substantially the same diameter of said casing, said cylindrical interface having a front aperture and a rear aperture, and a connection means for detachably connecting said expansion mandrel means, said connection means located proximate to said front aperture of said cylindrical interface, said cylindrical interface permanently attached to said first length of casing to become part of said casing after said bursting ram is removed.

23. A method for installing tubular casing underground, said method comprising the steps of:
a) placing a bursting ram at an entry point to a hole underground in a substantially horizontal direction, said hole having a diameter equal to or smaller than a diameter of said casing, said bursting ram comprising:
1) a fracturing mandrel means, said fracturing mandrel means having an outer surface and said fracturing mandrel means a body having a tapered shape with a diameter increasing from a front aperture to a rear aperture, said body having a diameter at said rear aperture exceeding the diameter of said hole and equal to or less than said diameter of said casing;
2) a covering means, said covering means detachably connected to said fracturing mandrel means to at least partially enclose said front aperture; and
3) a detachable connection means for connecting said fracturing mandrel means to said casing, said detachable connection means located proximate to said rear aperture;

b) attaching a first length of casing to said detachable connection means;

c) applying force in a longitudinal direction to the rear of said first length of casing to drive said bursting ram and said casing into said hole;

d) attaching additional lengths of casing to said first length of casing as necessary until said bursting ram starts to exit said hole and said casing is placed in said hole; and e) disassembling and detaching said bursting ram from said first length of casing as said bursting ram exits said hole.

24. The method for installing tubular underground casing as described in claim 23, further comprising the steps of attaching a drawing means to said bursting ram means via a cable means; and operating said drawing means to pull said bursting ram and casing through said hole.

25. The method for installing tubular underground casing as described in claim 23, further comprising the step of slip lining said casing with material suitable for fluid handling applications.

26. The method for installing tubular underground casing as described in claim 25, further comprising the step of installing the lining at essentially the same time as the casing is installed.

27. The method for installing tubular underground casing as described in claim 23, further comprising a sectional casing that has a suitable lining material attached to an inner wall of said sectional casing with coupling means for said sectional casing that will not damage said lining.

28. The method for installing tubular underground casing as described in claim 27, further comprising a threaded coupling means between casing sections.

29. The method for installing tubular underground casing as described in claim 23, further comprising the step of pulling conduit through said casing.

30. The method for installing tubular underground casing as described in claim 23, further comprising the step of attaching a cylindrical interface between said fracturing mandrel means ans said first length of casing, said cylindrical interface having substantially the same diameter of said casing, said cylindrical interface having a front aperture and a rear aperture, and a connection means for detachably connecting said fracturing mandrel means, said connection means for detachably connecting said fracturing mandrel means, said connection means located proximate to said front aperture of said cylindrical interface, said cylindrical interface permanently attached to said first length of casing to become part of said casing after being installed underground by said bursting ram.

31. The method as defined in claim 23, further comprising at least one expansion mandrel means, the smallest diameter expansion mandrel means comprising a body having a frusto conical shape having a diameter increasing from a front aperture to a rear aperture, said expansion mandrel means having said front aperture diameter approximately equal the diameter of the rear aperture of said fracturing mandrel means, in the event of one or more additional and successively larger expansion mandrels, they will have a shape similar to the first, with the mandrel's front aperture equal to the rear aperture of the preceding and next smaller mandrel's rear aperture, with the largest diameter expansion mandrel's rear aperture equal to the casing diameter, said expansion mandrel means having connection means for detachably connecting said expansion mandrel means between said fracturing mandrel means and said casing or successive expansion mandrel means, wherein said diameter of said expansion mandrel means at said rear aperture is equal to or less than said diameter of said casing.

32. The method for installing tubular underground casing as described in claim 31, further comprising the step of attaching a cylindrical interface between the largest diameter expansion mandrel means and said first length of casing, said cylindrical interface having a front aperture and a rear aperture, and a connection means for detachably connecting said expansion mandrel means, said connection means located proximate to said front aperture of said cylindrical interface, said cylindrical interface permanently attached to said first length of casing to become part of said casing after said bursting ram is removed.

33. A method for installing tubular casing underground, said method comprising the steps of:
  a) placing a bursting ram at an entry point to a fracturable pipe laid underground in a substantially horizontal direction, said fracturable pipe having a diameter equal or smaller than a diameter of said casing, said bursting ram comprising:
    1) a fracturing mandrel means for fracturing said pipe, said fracturing mandrel means having and outer surface and said fracturing mandrel means a body having a tapered shape with a diameter increasing from a front aperture to a rear aperture, said body having a diameter at said rear aperture exceeding the inside diameter of said pipe and equal to or less than said diameter or said casing;
    2) a covering means, said covering means detachably connected to said fracturing mandrel mans to at least partially enclose said front aperture; and
    3) a detachable connection means for connecting said fracturing mandrel means to said casing, said detachable connection means located proximate to said rear aperture;
  b) attaching a first length of casing to said detachable connection means;
  c) attaching a drawing means to said bursting ram means via a cable means and pulling said bursting ram and casing through said pipe;
  d) attaching additional lengths of casing to said first length of casing as necessary until said bursting ram exits said pipe ans said casing replaces said pipe; and
  e) disassembling and detaching said bursting ram from said first length of casing.

34. The method for installing tubular underground casing as described in claim 33, further comprising the step of slip lining said casing with material suitable for fluid handling applications.

35. The method for installing tubular underground casing as described in claim 34, further comprising the step of installing the lining at essentially the same time as the casing is installed.

36. The method for installing tubular underground casing as described in claim 33, further comprising a sectional casing that has a suitable lining material attached to an inner wall of said sectional casing with coupling means for said sectional casing that will not damage said lining.

37. The method for installing tubular underground casing as described in claim 36, further comprising a threaded coupling means between casing sections.

38. The method for installing tubular underground casing as described in claim 33, further comprising the step of pulling conduit through said casing.

39. The method for installing tubular underground casing as described in claim 33, further comprising the step of attaching a cylindrical interface between said fracturing mandrel means and said first length of casing, said cylindrical interface having substantially the same diameter of said casing, said cylindrical interface having a front aperture and a rear aperture, and a connection means for detachably connecting said fracturing mandrel means, said connection means located proximate to said front aperture of said cylindrical interface, said cylindrical interface permanently attached to said first length of casing to become part of said casing after being installed underground by said bursting ram.

40. The bursting ram as defined in claim 33, further comprising at least one expansion mandrel means, the smallest diameter expansion mandrel means comprising a body having a frusto conical shape having a diameter increasing from a front aperture to a rear aperture, said expansion mandrel means having said front aperture diameter approximately equal the diameter of the rear aperture of said fracturing mandrel means, in the event of one or more additional and successively larger expansion mandrels, they will have a shape similar to the first, with the mandrel's front aperture equal to the rear aperture of the preceding and next smaller mandrel's rear aperture, with the largest diameter expansion mandrel's rear aperture equal to the casing diameter, said expansion mandrel means having connection means for detachably connecting said expansion mandrel means between said fracturing mandrel means and said casing or successive expansion mandrel means, wherein said diameter of said expansion mandrel means at said rear aperture is equal to or less than said diameter of said casing.

41. The method for installing tubular underground casing as described in claim 40, further comprising the step of attaching a cylindrical interface between the largest diameter expansion mandrel means and said first length of casing, said cylindrical interface having substantially the same diameter of said casing, said cylindrical interface having a front aperture and a rear aperture, and a connection means for detachably connecting said expansion mandrel means, said connection means located proximate to said front aperture of said cylindrical interface, said cylindrical interface permanently attached to said first length of casing to become part of said casing after said bursting ram is removed.

42. A method for installing tubular casing underground, said method comprising the steps of:
  a) placing a bursting ram at an entry point to a pipe laid underground in a substantially horizontal direction said pipe having a diameter equal or less than said diameter of said casing, said bursting ram comprising:
    1) a fracturing mandrel means for fracturing said pipe, said fracturing mandrel means having an outer surface and said fracturing mandrel means a body having a tapered shape with a diameter increasing from a front aperture to a rear aperture, said body having a diameter at said rear aperture exceeding the inside diameter of said pipe and equal to or less than said diameter of said casing;
    2) a covering means, said covering means detachably connected to said fracturing mandrel means to at least partially enclose said front aperture; and
    3) a detachable connection means for connecting said fracturing mandrel means to said casing, said detachable connection means located proximate to said rear aperture;

b) attaching a first length of casing to said detachable connection means;

c) applying force in a longitudinal direction to the rear of said first length of casing to drive said bursting ram and said casing into said entry point and through said pipe;

d) attaching additional lengths of casing to said first length of casing as necessary until said bursting ram starts to exit said pipe and said casing replaces said pipe; and e) disassembling and detaching said bursting ram from said first length of casing as said bursting ram exits said pipe.

43. The method for installing tubular underground casing as described in claim 42, further comprising the steps of attaching a drawing means to said bursting ram means via a cable means; and operating said drawing means to pull said bursting ram and casing through said pipe.

44. The method for installing tubular underground casing as described in claim 42, further comprising the step of slip lining said casing with material suitable for fluid handling applications.

45. The method for installing tubular underground casing as described in claim 44, further comprising the step of installing the lining at essentially the same time as the casing is installed.

46. The method for installing tubular underground casing as described in claim 42, further comprising a sectional casing that has a suitable lining material attached to an inner wall of said sectional casing with coupling means for said sectional casing that will not damage said lining.

47. The method for installing tubular underground casing as described in claim 46, further comprising a threaded coupling means between casing sections.

48. The method for installing tubular underground casing as described in claim 42, further comprising the step of pulling conduit through said casing.

49. The method for installing tubular underground casing as described in claim 42, further comprising the step of attaching a cylindrical interface between said fracturing mandrel means and said first length of casing, said cylindrical interface having substantially the same diameter of said casing, said cylindrical interface having a front aperture and a rear aperture, and a connection means for detachably connecting said fracturing mandrel means, said connection means located proximate to said front aperture of said cylindrical interface, said cylindrical interface permanently attached to said first length of casing to become part of said casing after being installed by said bursting ram.

50. The method as defined in claim 42, further comprising at least one expansion mandrel means, the smallest diameter expansion mandrel means comprising a body having a frusto conical shape having a diameter increasing from a front aperture to a rear aperture, said expansion mandrel means having said front aperture diameter approximately equal the diameter of the rear aperture of said fracturing mandrel means, in the event of one or more additional and successively larger expansion mandrels, they will have a shape similar to the first, with the mandrel's front aperture equal to the rear aperture of the preceding and next smaller mandrel's rear aperture, with the largest diameter expansion mandrel's rear aperture equal to the casing diameter, said expansion mandrel means having connection means for detachably connecting said expansion mandrel means between said fracturing mandrel means and said casing or successive expansion mandrel means, wherein said diameter of said expansion mandrel means at said rear aperture is equal to or less than said diameter of said casing.

51. The method for installing tubular underground casing as described in claim 50, further comprising the step of attaching a cylindrical interface between the largest diameter expansion mandrel means and said first length of casing, said cylindrical interface having substantially the same diameter of said casing, said cylindrical interface having a front aperture and a rear aperture, and a connection means for detachably connecting said expansion mandrel means, said connection means located proximate to said front aperture of said cylindrical interface, said cylindrical interface permanently attached to said first length of casing to become part of said casing after said bursting ram is removed.

* * * * *